(12) United States Patent
Enzinger et al.

(10) Patent No.: US 7,258,307 B2
(45) Date of Patent: Aug. 21, 2007

(54) DEVICE AND METHOD FOR DAMPING AT LEAST ONE OF A RIGID BODY MODE AND ELASTIC MODE OF AN AIRCRAFT

(75) Inventors: Michael Enzinger, Neu Wulmstorf (DE); Michael Kordt, Hamburg (DE)

(73) Assignee: Airbus Deutschland GmbH (DE)

( * ) Notice: Subject to any disclaimer, the term of this patent is extended or adjusted under 35 U.S.C. 154(b) by 7 days.

(21) Appl. No.: 11/154,857

(22) Filed: Jun. 16, 2005

(65) Prior Publication Data

US 2007/0018053 A1    Jan. 25, 2007

Related U.S. Application Data

(60) Provisional application No. 60/606,602, filed on Sep. 2, 2004.

(30) Foreign Application Priority Data

Jun. 16, 2004    (DE)    ........................ 10 2004 029 194

(51) Int. Cl.
*G05D 3/20*    (2006.01)
(52) U.S. Cl. .................................................... 244/195
(58) Field of Classification Search ................. 244/194, 244/195, 76 C
See application file for complete search history.

(56) References Cited

U.S. PATENT DOCUMENTS

| | | | | |
|---|---|---|---|---|
| 2,832,551 A | * | 4/1958 | Gille ........................... 244/191 |
| 2,985,409 A | * | 5/1961 | Atwood et al. .............. 244/191 |
| 3,079,108 A | * | 2/1963 | Falkner et al. .............. 244/195 |
| 3,240,447 A | * | 3/1966 | Olshausen ................... 244/177 |
| 3,279,725 A | * | 10/1966 | Andrew et al. .............. 244/191 |
| 3,347,498 A | * | 10/1967 | Priestley et al. ............. 244/191 |
| 5,072,893 A | * | 12/1991 | Chakravarty et al. ...... 244/76 R |
| 5,224,667 A |  | 7/1993 | Lacabanne ................... 244/75 |

(Continued)

FOREIGN PATENT DOCUMENTS

DE    198 41 632 A1    3/2000

(Continued)

OTHER PUBLICATIONS

Tran C.B. et al, "Aircraft Fore and Aft Modal Suppression System" Proceedings of the Conference on Decision and Control, Los Angeles, CA, (Dec. 1987), Document No. XP002010955, pp. 2337-2340.

*Primary Examiner*—Timothy D. Collins
(74) *Attorney, Agent, or Firm*—Ostrolenk, Faber, Gerb & Soffen, LLP (57) ABSTRACT

A device for damping at least one rigid body mode and/or at least one elastic mode of an aircraft, especially for blast load reduction and increase of stability and comfort, in an airplane having at least one sensor, a regulation unit connected to the sensor, and at least one actuator controlling, guiding and/or regulating surfaces of the aircraft. The controller modifies the rigid body modes and/or the one or more elastic modes of the aircraft. With only one sensor signal of a sensor, which is preferably an acceleration signal, an arbitrary number and an arbitrary combination of rigid body modes and/or elastic modes, respectively, may specifically be modified, and the modes obtained are not influenced.

16 Claims, 6 Drawing Sheets

U.S. PATENT DOCUMENTS

| | | | |
|---|---|---|---|
| 5,375,793 A | * 12/1994 | Rivron et al. | 244/99.8 |
| 5,375,794 A | * 12/1994 | Bleeg | 244/76 C |
| 6,189,836 B1 | * 2/2001 | Gold et al. | 244/191 |
| 6,412,961 B1 | * 7/2002 | Hicks | 359/846 |
| 6,772,979 B2 | * 8/2004 | Kubica et al. | 244/195 |
| 2003/0205644 A1 | 11/2003 | Najmabadi et al. | 244/195 |
| 2005/0051666 A1 | * 3/2005 | Lee et al. | 244/10 |

FOREIGN PATENT DOCUMENTS

| | | |
|---|---|---|
| EP | 0 293 018 A2 | 11/1988 |
| EP | 0 742 142 A2 | 11/1996 |

* cited by examiner

DEVICE AND METHOD FOR DAMPING AT LEAST ONE OF A RIGID BODY MODE AND ELASTIC MODE OF AN AIRCRAFT

FIELD OF THE INVENTION

The present invention relates to the modification of a rigid body mode or an elastic mode of an element. In particular, the present invention relates to a damping device for damping at least one of at least one rigid body mode and at least one elastic mode of an aircraft and to a method of damping at least one of at least one rigid body mode and at least one elastic mode of an aircraft.

TECHNOLOGICAL BACKGROUND

A device having a sensor, a regulation or control device connected to the sensor and an actuator for driving controlling, guiding and/or regulating surfaces of the aircraft is known.

SUMMARY OF THE INVENTION

The invention further concerns a method for damping at least one rigid body mode and/or at least one elastic mode of an airplane, especially for blast load reduction and increase of stability and comfort in an airplane having at least one sensor means as well as having a regulation unit connected with the one or the several sensor means and at least one actuator acting upon controlling, guiding and/or regulating surfaces of the aircraft.

There may be a need for a lowering of arbitrary local and global structural loads in aircrafts, which are induced e.g. by blast induced and/or manoeuvering induced excitation of rigid body modes and/or elastic modes.

The used short term "mode" concerns a "rigid body mode" and/or an elastic mode of the aircraft.

Moreover, the device according to an exemplary embodiment of the invention or the method according to an exemplary embodiment of the invention, respectively, may serve for increasing comfort as well as increase stability of the aircraft by means of a damping of the respective "rigid body modes" and/or elastic eigenmovements.

From the state of the art, a plurality of regulation systems for decreasing rigid body modes and/or elastic modes, generally also called modes, in aircrafts are known. Theoretically optimal turns out to be, for example, the design of a regulation system having a leading back of state vector which admittedly until now failed due to the necessity of an "exact observer" who implies a very high computational effort.

Alternatively, the eigenmovements or modes ascribed to the airplane, according to a back transform from the modal space into the physical space, as far as measurement technology is concerned, may be determined by means of a linear combination of different acceleration values. In order to come along with a reduced number of sensors in this case though, a filtering of the signal, mostly by means of filters of low order, is necessary for band limiting.

As a further possibility for determining the signal to be lead back from out of only one measurement value, for example a laborious filtering is applied in the state of the art. In this context, a subtractive method is concerned, wherein from the measurement signal, by connecting low pass filters and notch filters in series, all signal portions besides the wished mode are filtered out.

Further, it is often necessary to adapt the regulation system to the eigenfrequencies of the airplane which change, for example, as a consequence of the mass change due to the continuous fuel consumption.

With respect to the selection and driving of the controlling, guiding and regulating surfaces, up to now in known regulation systems only integral indicators are considered, as for example the lowering of the effective value of a load or an acceleration at a certain position.

Moreover, previous regulation systems mostly concern special solutions for very special vibration problems, which are usually problems of comfort. Thereby, the applicability of such regulating systems is restricted to the body structure of an airplane, and may not offhand be transferred to other components. Further, until now, due to the high computational effort, it is only possible, with a justifiable effort, to influence a strongly limited number of modes. In this context, for the most part a rigid body mode or the first body or wing bending mode is concerned. In order to create the necessary leading back signal, there have to be applied several acceleration sensors, which not only increases the system's technical effort, but also the probability of malfunction.

Although regulating systems which detect a certain mode out of a measurement signal by means of simple filtering of a certain mode may be technically realised, due to the still too broad-band leading back, in spite of the effected band limiting, they still excite other, unwanted eigenmovements of the airplane and thereby influence the flight behaviour in a negative way. In turn, therefrom again may result disadvantages in the region of the flight behaviour as well as an increase of loads and acceleration(s) at other components of the airplane.

In order to face the shown problems, the modal design of regulation is applied in known regulation systems. The modal leading back requires a very great system complexity though, since in principle for each eigenmovement to be influenced, an individual leading back signal has to be created in a computationally involved way. This means that from a measurement signal, all modes besides the desired one have to be filtered out in a subtractive method by means of notch filters. After a subsequent phase correction, the signal may then be switched onto the controlling, guiding and regulating surfaces. Now, since each mode requires a different phase correction, there has to be built up one such branch for each respective mode accordingly. It is thereby not possible, to keep more than one mode within the measurement signal, since the phase can only be adapted for one mode.

It is common to all known regulation systems, that their design is connected to a high effort of optimising. The target functions in such optimisations, are in most cases effective values of the load or the acceleration at a certain body position of the airplane, as a consequence of which the possible excitation of other modes is not detected.

In contrary to this, the device according to an exemplary embodiment of the invention or the method according to an exemplary embodiment of the invention, respectively, are believed to allow the purposeful lowering of individual load peaks in the load spectrum or acceleration spectrum of the body structure, not only the lowering of an integral value of several modes.

Further, in known regulation systems, the controlling, guiding and regulating surfaces are only determined with respect to their global effectiveness in case of certain load problems, characterised by effective values. But if the controlling, guiding and regulating surfaces are not adapted to the modes in an optimal manner, further modes will be influenced even in case of an optimal leading back signal. Up to now, usually only one controlling, guiding and regulating surface is selected. This leads to a very low efficiency of the known regulation systems, so that greater control amplitudes and thereby longer actuator ways become necessary. To the one hand, from this follows an increase of the air resistance, and on the other hand an increased actuator wear.

An exemplary embodiment of the present invention is based on the aim to create a device as well as a method for damping rigid body modes and/or elastic modes of aircrafts, which avoids the indicated disadvantages of the before mentioned regulation systems.

According to an exemplary embodiment, by means of the controller or a regulator, at least one respective rigid body mode and/or at least one respective elastic mode of the aircraft may be modified, allowing for a reduction of the rigid body modes and/or eigenmovements and/or elastic modes of the aircraft, and thereby a substantial reduction of structural loads.

According to an exemplary embodiment, the rigid body modes and/or eigenmovements and/or elastic modes of the aircraft, which may lead to load problems, comfort problems or stability problems, may be reduced by means of controlling, guiding and regulating surfaces disposed at the aircraft and controlled by means of the controller. The regulation is thereby effected depending on the measurement values detected by a sensor and processed by means of filter elements. The regulation is effective in selected small frequency ranges of the rigid body eigenmovement and/or the elastic mode of the aircraft. At first, the approach according to this exemplary embodiment is general and may be applied to arbitary local and/or global load problems, stability problems and comfort problems or a combination of these problems in aircrafts of any kind.

It is believed that it is advantageous that a device according to an exemplary embodiment of the present invention or a method according to an exemplary embodiment of the present invention, respectively, acts frequency selective and thereby, as far as the processing of the leading back signal is concerned, when modifying a certain mode, all others usually remain un-effected. Thereby neither the rigid body eigenmovements to be obtained, nor the elastic eigenmovements to be obtained are negatively influenced.

The output side of a device according to an exemplary embodiment of the present invention or a method according to an exemplary embodiment, respectively, is based on a modal criterion which designs the phase position and the amplitude distribution of the controlling, guiding and regulating surfaces according to the nature of the eigenvector of the relevant mode. Thereby is secured, that even when an optimal leading back signal is given, besides the one(s) to be influenced, no further modes are modified. When the deflections of the controlling, guiding and regulating surfaces are optimally adapted with respect to amplitude and phase, a maximum influencing of the modes to be modified in the sense of the design is reached with minimal control effort. In comparison to known regulation systems or methods, respectively, the control effort may be reduced to 10-15%. Thereby, the lifetime of the actuators is increased, while at the same time the air resistance is reduced and a thereby a reduction of fuel consumption is caused.

Moreover, a device according to an exemplary embodiment of the present invention, or a method according to an exemplary embodiment of the present invention, respectively, may only require one (acceleration) sensor, whereupon a high availability and fail-safety is obtained. At the same time, the application of an internal sensor increases the availability, since this cannot be influenced by outer influences like for example bird strike etc. Further, it may be possible, that a device according to an exemplary embodiment of the present invention participates to use an already existing sensor, so that no further additional equipment is necessary.

By means of an exemplary embodiment of the invention, the necessary system complexity is considerably lowered, because to the one hand, only the application of one sensor may be necessary, and to the other hand an optimised, additive filter structure is applied.

This reduction of the system complexity in relation to known regulation systems is possible by use of resonance filters which at a low order of the system already provide the possibility to lead back small frequency intervals from the measurement signal to the actuators, and thereby to the controlling, guiding and/or regulating surfaces. Thereby, concerning the signals side, all modes which are not to be modified, remain unchanged due to their exclusion from the leading back signal. The reduction of the necessary degree of order of the filters is about between 60 and 70%, as compared to known subtractive methods.

Further, there results a great time advantage in the design phase of the device according to an exemplary embodiment of the invention, since all parameters may be determined analytically, so that extensive optimisations may be omitted. Thereby, a saving of time of 80 to 90% in the design phase results, as compared to other methods.

According to another exemplary embodiment of the invention, a frequency signal of a frequency measurement arrangement may be provided to the controller representing the frequency of at least one rigid body mode and/or at least one elastic mode.

Thereby, a what is believed to be optimal adaptation of the device according to the exemplary embodiment if the invention is given, when physical frame conditions change, as for example during a loss of mass of the aircraft as a consequence of continuous fuel consumption. Further, the security with respect to modelling errors which stem from the design phase is increased. The detection and analysis of the rigid body modes as well as the elastic eigenmovements of the aircraft for adaptation of the device according to an exemplary embodiment of the invention thereby do not have to occur in realtime. Since the mass depending frequencies only change slowly, a regularly, in medial time intervals occurring verification and, as the case may be, anew calibration of the device according to an exemplary embodiment of the invention is sufficient.

The device according to an exemplary embodiment of the invention or the method according to an exemplary embodiment of the invention, respectively, may be distinguished in that a provision for the eigenvector of the to be modified rigid body modes and/or elastic modes is effected, when selecting the control surfaces for maximising the efficiency, and in that the technical realisation of the device is effected by resonance filters for securing a small system complexity.

SHORT DESCRIPTION OF THE DRAWINGS

Further exemplary embodiments of the present invention are depicted in the following drawings and will be described in the following.

DETAILED DESCRIPTION OF EXEMPLARY EMBODIMENTS

Figure 1:
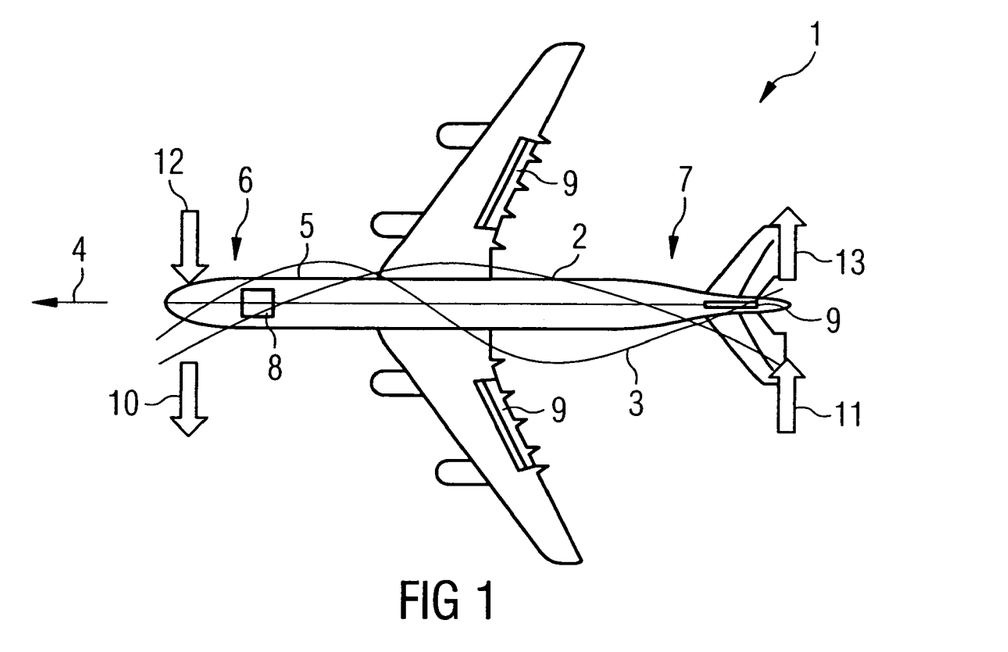
FIG. 1: shows a schematic description of two bending modes of an aircraft.

FIG. 1 shows an airplane 1, the body of which vibrates in a first and a second bending mode 2,3. In the illustration of FIG. 1, the airplane 1 moves in the direction of flight 4. Throughout the following, the term "mode" is used as abbreviation of the terms "rigid body mode", "rigid body movement mode" and/or "elastic eigenmovement or mode", respectively. The airplane 1 has a body 5, a nose 6 and a back 7. In the region of the nose 6, a sensor means 8 is disposed. In the region of the back 7, there are disposed controlling, guiding and regulating surfaces 9, for example in form of ailerons, trim surfaces, spoilers and rudders.

By means of a fixed law of regulation, it is not possible, to effectively damp two adjacent eigenmovements of the airplane 1 having closely neighboring frequencies, as well as different phase positions (knot positions), because the phase position can only be adapted to one eigenmovement at a time. If, for example, the nose 6 of the aircraft 1 moves in the direction of the arrow 10 with a certain velocity v, according to a law of regulation assumed here, for example a force F had to act at the back 7 in the direction of the arrow 11. If the regulation means now were to act in the same way for all modes, according to this law of regulation, the second bending mode 3 would unintentionally be excited simultaneously. Thereby, the nose 6 is moved in the direction of an arrow 12 with a velocity v, and a force F in the direction of the arrow 13 would in the range of the back 7 act upon this, regulated by the regulation means. As a result, the application of the same law of regulation to the first and the second bending mode 2,3 would lead to a destabilising of the 2. bending mode.

Figure 2:
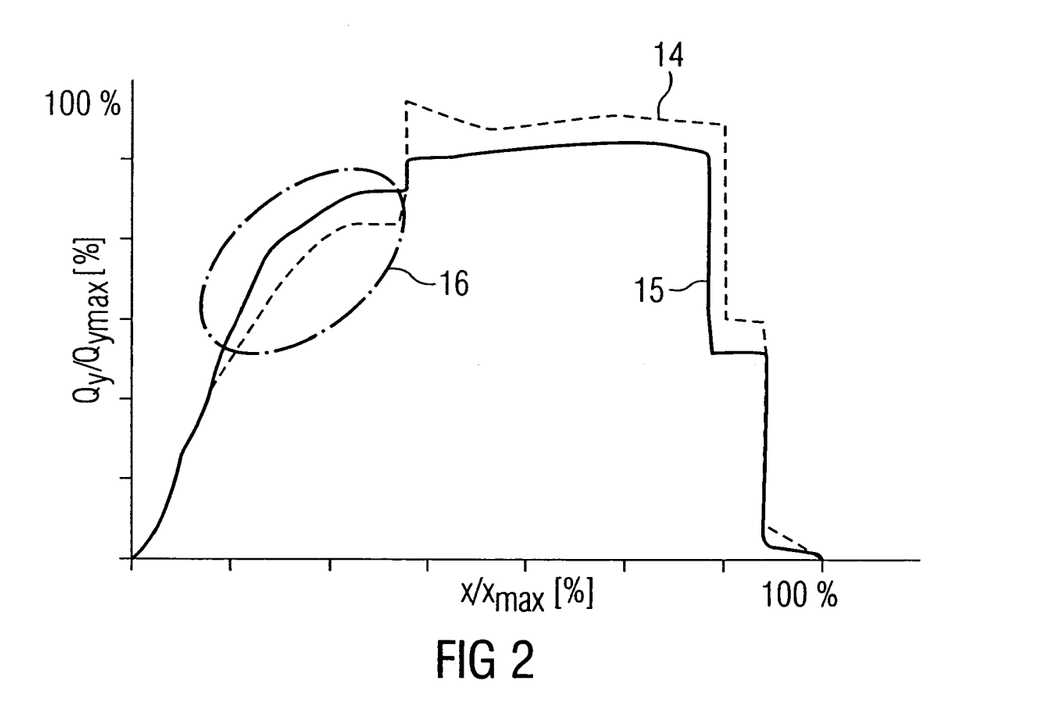
FIG. 2: shows a progression of the lateral force $Q_Y$ normalised to the maximum lateral force $Q_{Ymax}$, plotted versus the normalised body length of an aircraft in case of an excitation with lateral blasts.

FIG. 2 shows the progression of the lateral force $Q_Y$ normalised to the maximum lateral force $Q_{Ymax}$, plotted versus the normalised body length of an airplane in case of an excitation with continuous blasts.

At the vertical axis of the diagram, there is plotted the progression of the lateral force $Q_Y$, respectively referring to a maximum lateral force with respect to a certain position $x/x_{max}$ at the body 5 of the airplane 1. A curve progression 14 represents the maximally permittable lateral force $Q_Y$ in the respective position $x/x_{max}$ in the body of the airplane 1. A curve progression 15 reflects the actual progression of the lateral force $Q_Y$, which results without the application of the inventive device. It may be taken from the diagram of FIG. 2 that in a region of the accentuation 16, a overloading of the body structure or the body 5 of the airplane 1 may occur. This region is between the nose 6 and the region of the body 5 in which usually the airfoils are disposed. In this region, the allowable maximum value of the lateral force $Q_Y$ is exceeded to a remarkable extent, as is shown by the curve progression 15, which extends above the curve progression 14.

Figure 3:
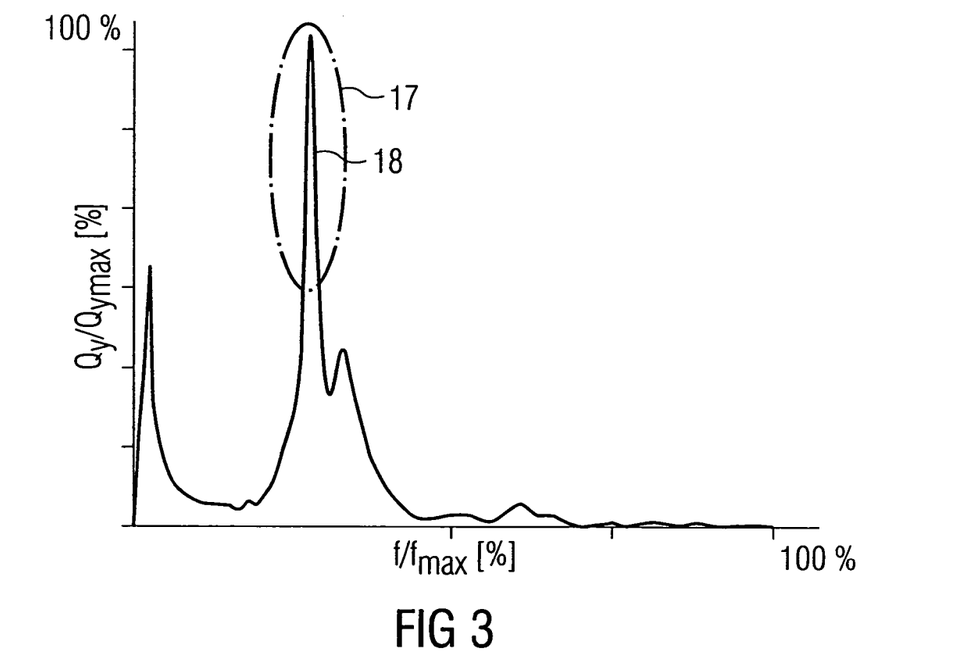
FIG. 3: shows a spectrum of the lateral force $Q_Y$ normalised to the maximum lateral force $Q_{Ymax}$, plotted versus the frequency f normalised to the maximum frequency $f_{max}$ in a front body region of the aircraft, when in a dominant mode.

FIG. 3 shows a spectrum of the lateral force $Q_Y$, normalised to the maximum lateral force $Q_Y$ max for a position at the body's front part, plotted versus the frequency f normalised to a maximum frequency $f_{max}$, of the airplane 1, when in a dominant mode.

At the vertical axis of the diagram, the progression of the lateral force $Q_Y$, each related to a maximum lateral force $Q_{Ymax}$ at a certain normalised frequency f/fmax is plotted. In the region of an accentuation 17, a dominant elastic mode 18 is clearly to be seen, which significantly contributes to increased load values within the body structure or the body 5, respectively, of the airplane 1.

Figure 4:
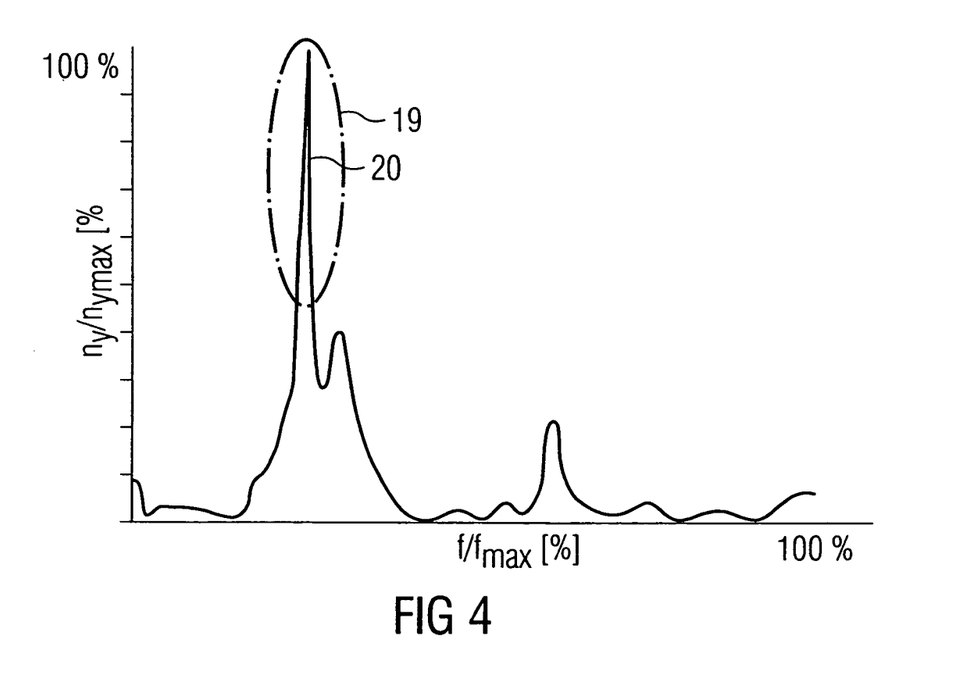
FIG. 4: shows an acceleration spectrum in the region of the position of a sensor means, when in a dominant mode.

The diagram shown in FIG. 4 shows an acceleration spectrum in the region of the position of a sensor means, when in a dominant mode.

To this end, the sensor means 8 is preferably situated in the front body region of the airplane 1. At the vertical axis of the diagram, the progression of the acceleration $n_Y/n_{Ymax}$ in case of certain normalised frequencies $f/f_{max}$ is plotted. In the region of an accentuation 19, a dominant eigenmovement 20 shows-up again. The maximum of this dominant eigenmovement 20 is in the range of about 33% of the maximum frequency $f_{max}$.

Figure 5:
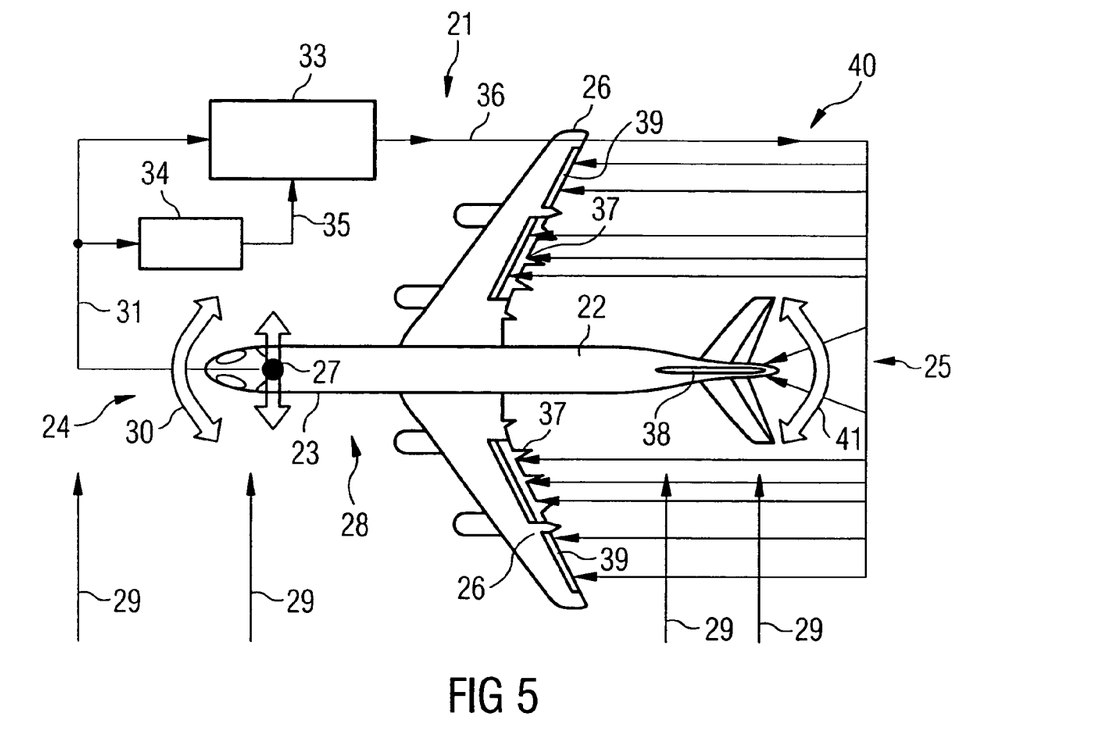
FIG. 5: shows a simplified schematic structure of a device according an exemplary embodiment of the invention.

In FIG. 5, the schematic structure of the device 21 according to an exemplary embodiment of the present invention is shown.

The illustration of FIG. 5 substantially concerns the measurement of the lateral acceleration $n_Y$ in a front body region of an airplane 22. The airplane 22, for example a big transport airplane or passenger airplane in a long version, has a body 23, a nose 24, a back 25, as well as airfoils 26. In the region of the nose 24, a sensor means 27 is disposed. A front body region 28 of the airplane 22 is laterally loaded by (lateral) blasts 29. The sensor means 27 serves to measure the lateral acceleration values $n_Y$ generated by the blasts 29 impacting upon the body 23. As a consequence of the blasts 29, rigid body modes and/or elastic aircraft modes are excited in the body 23, as is symbolised by the arrows 30,41. A measurement signal 31 outputted by sensor means 27 after a respective measurement technological processing, for example in an amplifier not shown here and/or in an anti-aliasing filter is led to a regulation arrangement or controller 33 and a frequency measurement arrangement 34 in parallel. From the frequency measurement arrangement 34, a frequency signal 35 is led to the regulation arrangement 33. The frequency signal 35 represents the frequency of at least one rigid body mode and/or at least one elastic eigenmovement of the airplane 22. The frequency measurement arrangement 34 also extracts the frequency signal 35 from the measurement signal 31 of the sensor means 27, for example by means of a digital analysis within a digital calculation unit. For the operation of the device 21 according to an exemplary embodiment of the present invention, a sensor means 27, for example in form of an acceleration sensor for detecting a lateral acceleration $n_Y$, is usually sufficient. Accordingly, accelerations in other spatial directions can be detected, to which end the modified sensor 27 may be provided.

Within the regulation arrangement 33, a mixed leading back signal or feedback signal 36 (comprising several lives) is generated, which, by means of actuators, not shown in detail in FIG. 5, is led back again to controlling, guiding and regulating surfaces 40 of the airplane 22 like, for example, aileron 39, rudder 38, spoiler 37, as well as other guide and trim surfaces as, for example, elevator, "Mini-Teds", "Tabs", "Gourney-Flaps", "Canards" and so on. The effect of the leading back signal 36, lead back from the regulation arrangement 33 via the actuators to the airplane 22 again is symbolised by the arrow 41.

Due to the rigid body modes and/or elastic eigenmovements of the airplane 22, detected by the sensor means 27 which within the regulation arrangement 33 are subject to a suitable modification for damping the unwanted modes and as a leading back signal 36 by means of the actuators are subsequently led back to the airplane 22 via the controlling, guiding and regulating surfaces 40 there results an effective damping of at least one rigid body mode and/or at least one elastic eigenmovement of the whole airplane 22.

Figure 6:
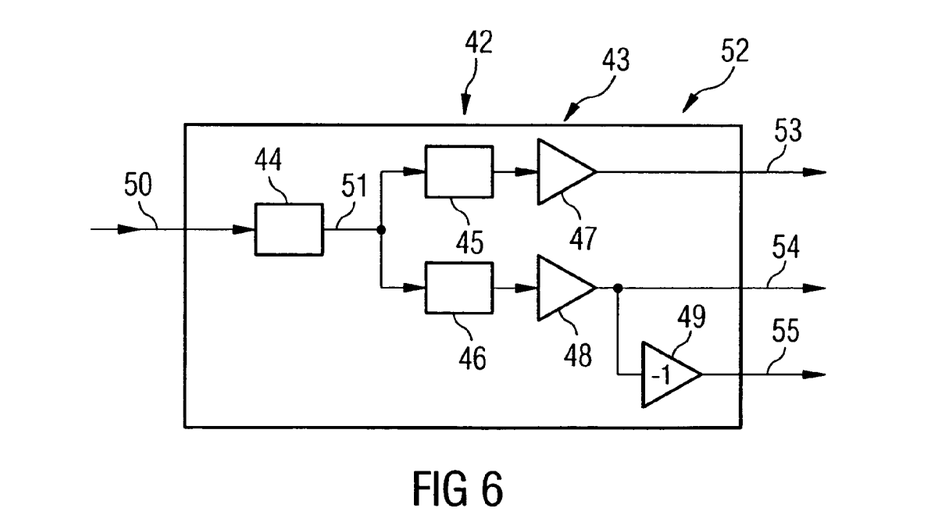
FIG. 6: shows detailed structure of a regulation device for modifying a mode.

FIG. 6 shows the detailed structure of the regulation arrangement for modifying a mode.

The regulation arrangement or controller 42 substantially comprises a regulation line 43. The regulation line 43 is constituted of a resonance filter 44, the phase correction units 45, 46, the amplifiers 47, 48 and an inverter 49.

To the resonance filter 44 is supplied a measurement signal 50, for example, in form of lateral acceleration values $n_Y$ measured by a sensor means in a front body region of the airplane. A signal 51 of the resonance filter 44 is then led to the phase correcting units 45, 46 in parallel. The phase correcting units 45,46 are each respectively followed by one of the amplification factor units 47,48. The amplification factor unit 48 is followed by an inverter 49. The amplification factor units 47, 48, as well as the inverter 49 form several leading back signals or feedback signals 52, which are led back via actuators which are not shown in detail in FIG. 6 to controlling, guiding and regulating surfaces of the airplane. Due to the connecting of the leading back signals 52 to respective controlling, guiding and regulating surfaces of the airplane, especially to aileron, rudder, spoiler, guiding surfaces, trim surfaces and the like, there results a damping of at least one rigid body mode and/or at least one elastic eigenmovement of the airplane as a whole. In the specific embodiment of FIG. 6, for example, the leading body signal 53 is led back to at least one aileron of the airplane, a leading back signal 54 (or feedback signal) is lead back to at least one aileron of the airplane, and a leading back signal 55 (or feedback signal) is led back to at least one spoiler, one trim surface or the like of the airplane.

The inverter 49 allows for a simple structure of the regulating unit 42, because the leading back signal 54 for actuating the actuators for the aileron, and the leading back signal 55 for actuating the actuators for operating the spoilers have a phase shift of 180° with respect to each other, so that by means of the inverter 49 from the leading back signal 54 for the aileron, the leading back signal 55 for actuating the spoiler may be generated by means of a simple inversion of sign in the inverter 49. Thereby, a phase correction unit may be economised. According to the number of modes or elastic modes of the airplane to be influenced, respectively, several regulated lines or regulated branches, respectively, have to be set in parallel. In a preferred manner, within the framework of the signal processing for each rigid body mode and/or elastic eigenmovement of the airplane to be modified, the regulation arrangement 42 has a separate regulated line, the structure of which corresponds to the regulated line 43, which has been explained further above within the framework of the explanation of FIG. 6. For signal processing within the regulation means 42, a filter of third order may be sufficient. Alternatively, a filter of higher or lower order may be provided.

In the embodiment shown in FIG. 6 the resonance filter 44 is applied as filter of second order. The measurement signal 50 is at first supplied to the reasonance filter 44. The resonance filter 44 thereby follows the transfer function TF:

$$TF = \frac{2*D*w_0^2}{s^2 + 2*D*w_0*s + w_0^2}$$

The phase correcting units 45, 46 of first order obey the transfer function $$TF = \frac{-c*s+1}{c*s+1}.$$

Further there are provided two amplification factor units 47, 48 which follow the phase correcting units 45, 46. In the above transfer functions, D refers to the damping and $\omega_0$ corresponds to the undamped eigenfrequency of the resonance filter 44. By means of the constant c, the phase shift in the phase correcting units 45,46 may be adjusted. The function of the resonance filter 44 is a discrete realtime fourier analysis. Thereby, there exists an easily realisable possibility, as far as system technology is involved, to obtain information concerning the searched vibration mode from the physical sum signal in form of the measurement signal 50 which exists in form of a discrete acceleration signal from the sensor. In an exemplary embodiment of the invention, the regulation means 42 is realised by means of a digital calculator unit.

The adjustment of the parameters contained in the transfer functions may require an analysis of the rigid body modes and the elastic eigenmovement of the airplane, in which a device according to an exemplary embodiment of the present invention shall be implemented.

To the one hand, the resonance filter 44 is described by its resonance frequency which corresponds to the resonance frequency of the airplane eigenmovement and/or elastic mode to be modified, and on the other hand by means of its damping, which shall turn out preferably low, in order to reach the required small band characteristic of the resonance filter 44.

The simple form of the resonance filter 44 stresses the advantage of the selective approach chosen here, as compared to previously known regulation systems. By means of only one filter of second order with only two parameters per mode which may easily be determined, the intended signal information, the required signal information concerning the mode to be damped, that is the rigid body mode and/or the elastic mode to be damped may be selected directly by means of the device or the method in accordance with an exemplary embodiment of the present invention. In contrast, in case of the subtractive method according to the state of the art, in case of an airplane having n modes, up to n−1 unwanted modes have to be filtered out. This means, there arises the (n−1)-fold effort in the design and in the realisation of such regulation systems.

The subsequent modification of the phase in the phase correcting units 45, 46 serves to compensate the sensor's dead time, the signal processing time in the regulating arrangement 42, the phase delay of the actuators, the phase delay of the in stationary aerodynamics of the airplane, the provision of the mixed leading back signals (or feedback signals) 52 (synthesis of velocity and acceleration) as well the phase position of the complex eigenvector of the airplane's relevant mode to be damped.

The mixed leading back signals or feedback signals 52 serve to obtain the resonance frequency of the mode to be modified in the closed regulation-loop. This is necessary to secure the operability of the resonance filter 44. By the term "mixed leading back" in this context is meant the combined leading back of acceleration signals and velocity signals. By means of the filtering, the velocity signal is obtained from the acceleration signal, so that no any additional separate sensor is required to this end. Taking into consideration the phase position and the local amplitude values of the complex eigenvector of the movement allows for a what is believed to be optimal adaptation of the regulation arrangement 42 to the modes of the airplane.

A device according to an exemplary embodiment of the present invention or a method according to an exemplary embodiment of the present invention is based on a modal view and, derived therefrom, on a criterion for phase adaptation and amplitude adaptation of the guiding, controlling and regulating surface deflections by means of the amplification factor units 47,48 to the eigenvector of the to be modified elastic eigenmovement and/or the rigid body mode.

This may allow for a maximum influenceability of the movement when a control effort and regulation effort is minimal, and on the other hand the appearance of linear distortions (excitation of other modes with the frequency of the target mode) is prevented. The interrelationship between the mode (eigenvector of the mode) to be affected, which means to be damped, and the input signal or kind of input circuitry required for influencing only the one mode which is lead back, no other modes, serves as a basis.

In the specific case, this means that the damping of a body mode requires the presence of ailerons, rudders, spoilers or the like, operated by actuators. If, for adapting the regulating arrangement 42, a state vector feedback is assumed (the relevant part of the state vector is created by filtering the original vector), it may be shown in modal form, that, for exclusive modification of a discrete eigenmovement, the number of necessary control inputs has to be equal to the number of physical degrees of freedom. From this it may be followed, that theoretically, the application of compensation forces, created from leading back or feedbac acceleration (or position, respectively) and velocity to all mass-points of the aircraft, would be necessary for complete damping of all relevant modes. In practice, this is not may not be realized in an ideal manner, due to the high number of degrees of freedom. Taking into account these theoretical boundary conditions, a what is believed to be an optimal approach may be obtained by means of the available guiding, controlling and regulating surfaces.

From a load analysis according to the diagram of FIG. 3 at a selective position in the front body region of the airplane, the dominance of the elastic mode 18 can be seen, which significantly attributes to the overall mechanical stress of the airplane. With respect to this one dominant elastic mode 18, in the following shall at first be explained, how this may be damped effectively by means of a device according to an exemplary embodiment of the present invention. In this respect, the regulation arrangement 42 comprises only one regulation line 43, since at first only the single dominant mode 18 shall be damped.

Figure 7:
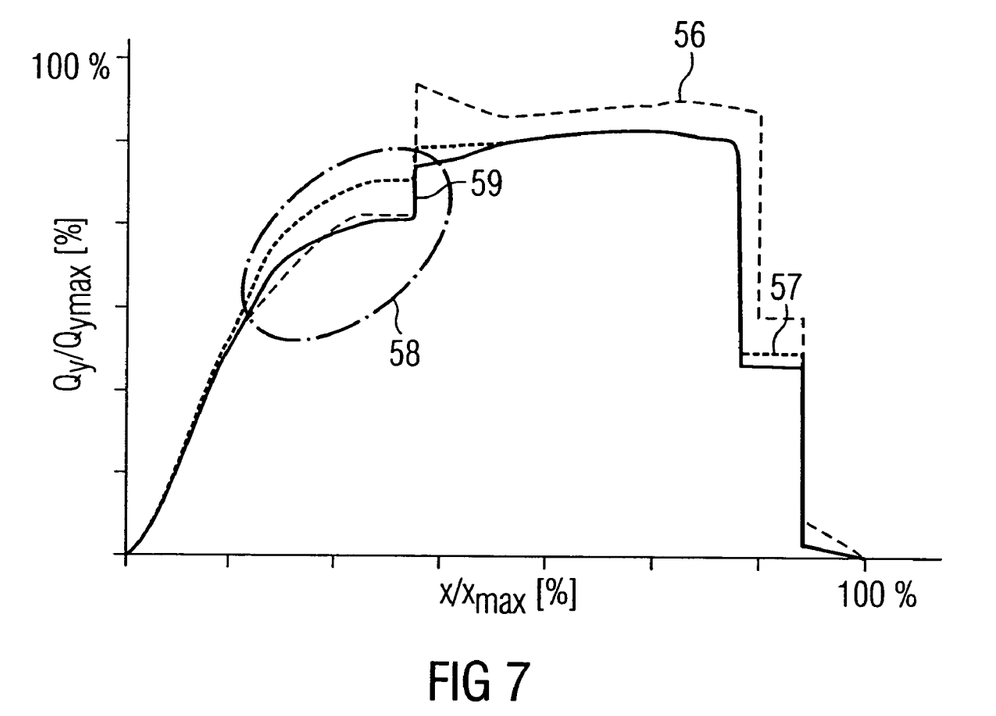
FIG. 7: shows progression of the lateral force $Q_Y$ normalised to the maximum lateral force $Q_{Ymax}$, plotted versus the normalised body length of the airplane without and with application of the device according an exemplary embodiment of the invention.

The diagram of FIG. 7 at first shows the progression of the lateral force $Q_Y$ normalised to the maximum lateral force $Q_{Ymax}$, plotted versus the normalised body length of the airplane without and with applying a device according to an exemplary embodiment of the present invention, as compared to a progression of the maximally acceptable load.

At first all three curve progressions shown have in common that there is a discontinuity-position. in the region of a body position $x/x_{max}$ of about 40 percent, This discontinuity is approximately in a region, in which the airfoils are disposed at the airplane.

At first, a curve progression 56 illustrates the maximum acceptable lateral force $Q_Y/Q_{Ymax}$ wherein the lateral force $Q_Y$ is respectively related to a maximal lateral force $Q_{Ymax}$, which must not be exceeded in any case at a certain body position $x/x_{max}$ of the airplane. A curve progression 57 symbolises the progression of the lateral force $Q_Y/Q_{Ymax}$ which results without the application of a device according to an exemplary embodiment of the present invention. In this respect, it shall be noted that there results an overloading in the range of an accentuation 58, which means in the front body region of the airplane. A curve progression 59 eventually reflects the progression of the lateral forces $Q_Y/Q_{Ymax}$ resulting from the application of a device according to an exemplary embodiment of the present invention. Thereby, the curve progression 59 is always considerably below the maximally acceptable lateral forces $Q_Y/Q_{Ymax}$ according to the curve progression 56.

Subsequent to respective design and dimensioning of the regulation arrangement according to the criteria stressed further above, within the frame of the description of FIG. 6, for the airplane having a device according to an exemplary embodiment of the present invention, there are obtained substantially reduced stresses in the front body region. Especially the dominant mode creating this stress (see FIG. 3) was effectively damped by means of a device according to an exemplary embodiment of the present invention.

Figure 8:
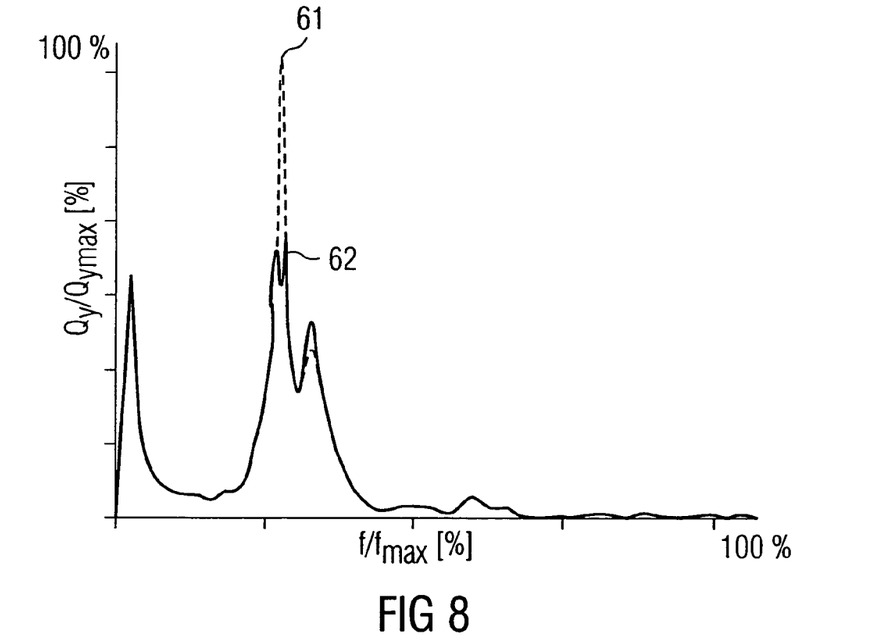
FIG. 8: shows a spectrum of the lateral force $Q_Y$ normalised to the maximum lateral force $Q_{Ymax}$, plotted versus the frequency f normalised to a maximum frequency $f_{max}$ in the front body region of the airplane without and with application of the device according to an exemplary embodiment.

The diagram of FIG. 8 shows the spectrum of the lateral force $Q_Y$, normalised to the maximum lateral force $Q_{Ymax}$, plotted versus the frequency f normalised to a maximum frequency $f_{max}$ in the front body region of the airplane without and with application of the device.

The curve-progression 61 represents the spectrum of the lateral force $Q_Y/Q_{Ymax}$ without application of a device according to an exemplary embodiment of the present invention or a method according to an exemplary embodiment of the present invention, respectively. The curve progression 62 reflects the spectrum of the lateral force $Q_Y/Q_{Ymax}$ though, which results from applying a device according to an exemplary embodiment of the present invention or a method according to an exemplary embodiment of the present invention, respectively. It can be seen that in the region of about 25 percent of the maximum frequency of the spectrum $f_{max}$, a significant lowering of the amplitude of the dominant mode of the lateral forces $Q_Y/Q_{Ymax}$ of the body of the airplane results from the application of the device.

Thereby, the mechanical load of the body or the body structure of the airplane, respectively, is substantially reduced.

Figure 9:
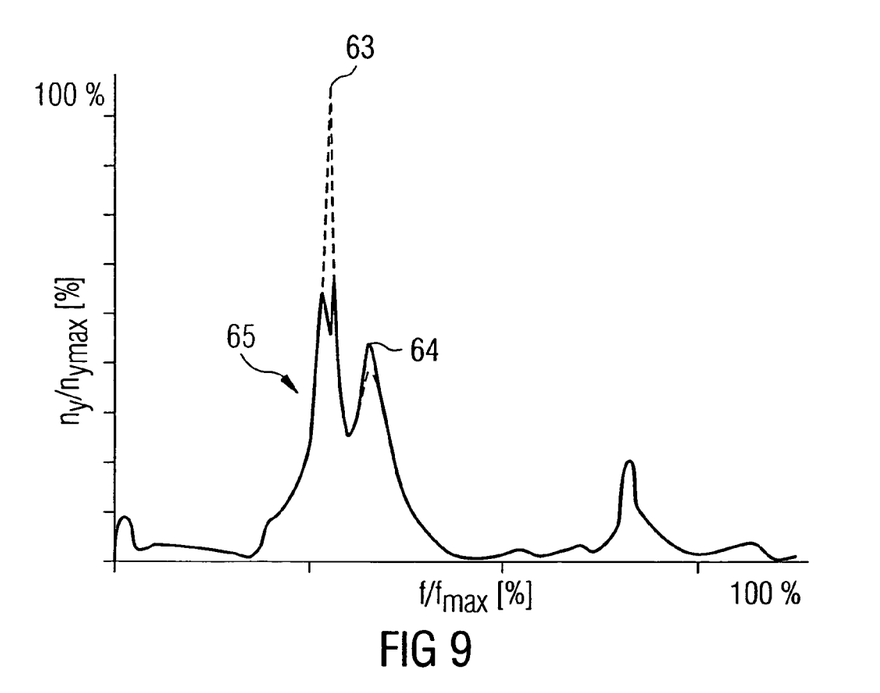
FIG. 9: shows an acceleration spectrum $n_Y/n_{Ymax}$, plotted versus the frequency f normalised to the maximum frequency $f_{max}$ in the region of the sensor means in the front body region of the airplane with and without application of the device.

The diagram of FIG. 9 shows the acceleration spectrum $n_Y/n_{Ymax}$ plotted versus the frequency $f/f_{max}$ normalised to a maximal frequency in the range of the sensor means in the front body region of the airplane without and with application of a device according to an exemplary embodiment of the present invention.

At the vertical axis of the diagram, the lateral acceleration values $n_Y$, each related to a maximum acceleration value $n_{Ymax}$ in the region of the position of the sensor means are plotted versus the frequency ratio $f/f_{max}$.

A curve progression 63 represents the acceleration values $n_Y/n_{Ymax}$ without the application of the device, whereas a curve progression 64 reflects the acceleration values $n_Y/n_{Ymax}$ that result from the application of the device. From the representation of the diagram of FIG. 9, it can be seen, that the curve progression 64 which results from the application of a device according to an exemplary embodiment of the present invention is substantially below the curve progression 63 in the region of a dominant mode 65, so that reduced acceleration values $n_Y/n_{Ymax}$ result. The acceleration values $n_Y/n_{Ymax}$ at certain positions of the body of the airplane are relevant for stability problems and comfort problems.

As a consequence of the application of a device according to an exemplary embodiment of the present invention or a method according to an exemplary embodiment of the present invention, respectively, there may result a substantial improvement of the stability and the comfort of the airplane.

Figure 10:
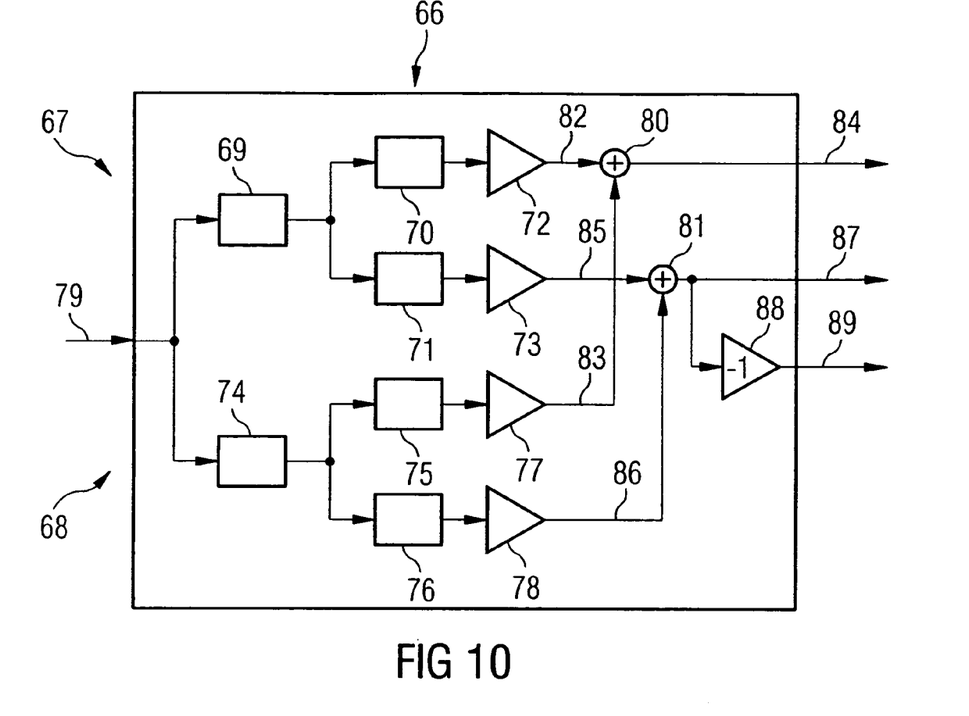
FIG. 10: shows a structure of a device for simultaneous modifying several modes.

FIG. 10 illustrates a detailed inner structure of an embodiment of the regulation arrangement or controller 66 within a device according to an exemplary embodiment of the present invention for modifying two modes at the same time.

The internal structure of the regulation arrangement 66 in principle corresponds to the structure of the regulation arrangements already described, which are directed to damping one mode. In contrary to the already described regulation arrangements, the regulation arrangement 66 has two regulation lines 67,68. The regulation line 67 substantially comprises a resonance filter 69 as well as two parallel following phase correction units 70,71, wherein following to each of it, an amplification unit 72 and 73 is disposed. Accordingly, the regulation line 68 comprises a resonance filter 74, to which the phase correcting units 75,76 are following in parallel. The phase correcting units 75, 76 themselves each are followed by the amplification units 77 and 78. To the resonance filters 69,74 is supplied a measurement signal 79, for example, in the form of a lateral acceleration signal $n_Y$ detected by the sensor means. Further, the regulation arrangement 66 has the adding units 80,81. The adding units 80,81 are only necessary, if two or more modes, i.e. rigid body mode and/or elastic modes, are to be damped. In this case, the output signals of the respective resonance filters 69, 74 (one per mode, respectively) are adjusted individually with respect to phase and amplitude by means of the phase correcting units 70,71,75,76 and the amplifying units 72,73,77,78, and are subsequently combined into one respective leading back signal or feedback signal 84,87,89 per controlling, guiding and/or regulating surface.

A leading back signal or feedback signal 82 of the amplification factor unit 72 is led to the adding unit 80. In order to create a leading back signal or feedback signal 84, a leading back signal or feedback signal 83 of the amplification unit 77 is led to the adding unit 80 as well. The leading back signal 84 serves to actuate respective controlling, guiding and/or regulating surfaces of the airplane, for example in form of the rudder, by means of actuators, which are not shown in further detail. A leading back signal 85 of the amplification factor unit 73 is led to the adding unit 81. Further, a leading back signal 86 of the amplification factor unit 78 is also led to the adding unit 81 for creating a leading back signal 87. The leading back signal 87 in turn serves to actuate respective controlling, guiding and regulating surfaces of the airplane, like, for example, the ailerons, by means of actuators not shown in further detail. Eventually, the leading back signal 87 behind the adding unit 81 is led in parallel via an inverter 88 for creating a leading back signal 89. The leading back signal 89 serves for actuating respective controlling, guiding and regulating surfaces of the airplane, especially for actuating the spoilers by means of actuators not shown in further detail. In using the inverter 88, an allowable phase correcting unit is economised, since the necessary leading back signals 87,89 between the ailerons and the spoilers of an airplane in this case show a phase shift of 180°.

In the diagram of FIG. 10, it is clearly to be seen that for damping each rigid body mode and/or elastic eigenmovement of the airplane there is necessary an individual respective regulation line 67,68. Thereby, all components of the regulation arrangement 66, with respect to the modes to be damped of the airplane have to be configured individually. In contrary to the known regulation arrangements there are not filtered out all unwanted modes besides the one to be damped in a subtractive and therefore involved procedure, but by means of the resonance filters 69,74 only the relevant modes are passed for further processing in the regulation arrangement 66.

By means of a device according to an exemplary embodiment of the present invention, not all disturbing modes are damped equally. It is possible that a strongly disturbing mode is damped considerably strong while a weaker mode—a mode which possibly is not disturbing at all—is even amplified a bit. If the integral over all modes in the frequency range from 0 to 10 Hz is considered, in any case, in an integral point of view, there results a substantial damping, as compared to a system not damped by means of a device according to an exemplary embodiment of the present invention.

Figure 11:
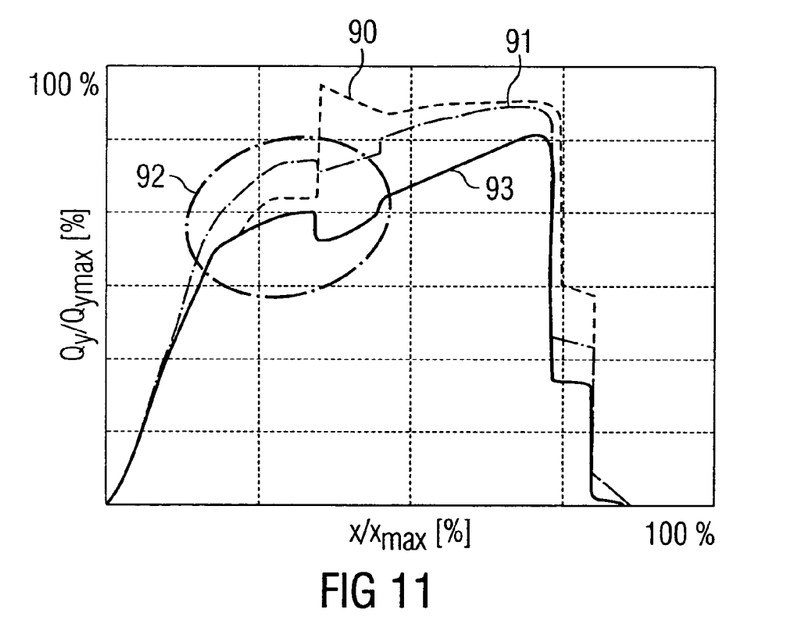
FIG. 11: shows a progression of the lateral force $Q_Y$ normalised to the maximum lateral force $Q_{Ymax}$, plotted versus the normalised body length of the airplane, when damping several modes without and with application of a device according to an exemplary embodiment of the present invention.

FIG. 11 shows the progression of the lateral force $Q_Y$ normalised to the maximum lateral force $Q_{Ymax}$, plotted versus the normalised body length $x/x_{max}$ of the airplane, when damping two modes, each with and without application of the device, as well as compared with a further curve.

A curve progression 90 reflects the maximally acceptable loading values. A curve progression 91 symbolises the progression of the lateral forces without the application of a device according to an exemplary embodiment of the present invention. From the comparison of the curve progressions 90,91, it results that the allowed limit values of the normalised lateral force $Q_Y/Q_{Ymax}$ is transgressed at least in the range of an accentuation 92. By means of the application of a device according to an exemplary embodiment of the present invention, there results a falling below the maximally allowed lateral forces over the whole body length of the airplane, as is illustrated by a curve progression 93.

According to a method according to an exemplary embodiment of the present invention (see FIG. 5), the measurement signal 31 is supplied to the regulation unit 33, for example in form of the lateral acceleration signal $n_Y$ of the regulation unit 33 within a device according to an exemplary embodiment of the present invention. The measurement signal 33 is detected by means of a sensor means 27 in the front body region of the airplane 22, and in this context represents at least one actual elastic eigenmovement and/or at least one elastic eigenmovement of the airplane 22. Within the regulation arrangement 33, the processing of the measurement signal 31 to a leading back signal 36 is effected by respective filter means. The internal structure of the regulation arrangement 33 thereby follows the structure explained within the frame work of the description of FIG. 6 and FIG. 11. According to a further embodiment of the regulation arrangement 33 for carrying out aspects according to the invention (which is not shown in the figures in further detail), it is possible to provide an arbitrary number of parallel filter lines.

The leading back signal 36 during the carrying out of the procedure according to the invention by means of actuators not shown in further detail is lead back to respective controlling, guiding or regulating surfaces of the airplane 22 especially aileron, rudder, spoiler and the like, for damping at least one critical rigid body mode and/or at least one elastic eigenmovement. Thereby an effective damping of the critical rigid body modes and/or elastic modes of the airplane results.

Prior to an effective application of a device according to an exemplary embodiment of the present invention or carrying out a method according to an exemplary embodiment of the present invention, the regulation arrangement at first has to be accordingly configured during the development phase of the airplane.

This is effected by a complete analysis of the transfer functions and modes of the integral flight-dynamics model of the airplane. The results of the complete analysis are then used for selecting suitable sensor means, suitable positions for disposing the sensor means as well as suitable controlling, guiding and regulating surfaces for optimal damping critical rigid body modes and/or elastic modes. Preferably, as sensor means are used acceleration sensors which are positioned in the front body region of the airplane.

According to a variant of a method according to an exemplary embodiment of the present invention, at the same time, the frequencies of the rigid body modes to be modified and/or the elastic eigenmovements of the airplane are detected by means of the frequency measurement arrangement. To this end, the frequency measurement arrangement outputs a frequency measurement signal, which is supplied to the regulation arrangement. Thereby, an adaptation to different mass relations of the airplane during the course of the flight, for example caused by the continuous consumption of fuel, is taken into account.

By means of a phase and amplitude consideration of the relevant modes, the resonance filters, the phase correcting units as well as the amplification factor units are configured in such a way that when leading back the leading back signals outputted by these units to the controlling, guiding and regulating surfaces of the airplane, an optimal damping of the selected rigid body modes and/or the elastic modes results.

By means of a method according to an exemplary embodiment of the present invention, it is possible, as a result, to effectively damp the amplitude of at least one rigid body mode and/or at least one elastic eigenmovement of the airplane, wherein the regulation technological effort is as small as possible. In comparison to the known methods, which are based on a subtractive removal of unwanted modes besides the mode to be modified, there results a considerably reduced system complexity.

A device according to an exemplary embodiment of the present invention, as well as a method according to an exemplary embodiment of the present invention may be applied to arbitrary local and global load problems, stability problems and comfort problems, especially in big airplanes. Thereby for the first time results the possibility, in using only one measurement signal of a discrete sensor means, for example in form of a lateral acceleration sensor $n_Y$, to specifically modify an arbitrary number and an arbitrary combination of rigid body modes and/or elastic eigenmovements of the airplane, without influencing modes to be preserved in a negative way. This is made possible by the structure of a modal regulation without the necessity of an observer, so that, as a result, a considerably reduced system complexity results. According to an exemplary embodiment of the invention, the adaptation of the deflection to the selected controlling, guiding and regulating surfaces to the local amplitudes of the modes for allowing a maximal damping may be possible, when, at the same time, a control effort is minimal. The required deflections of the selected controlling, guiding and regulating surfaces are only 10 to 15 percent, as compared to the previous methods or devices, respectively. Thereby, by means of a device according to an exemplary embodiment of the present invention or a method according to an exemplary embodiment of the present invention the loading of the actuators may be reduced. In turn, this may allow for a a reduced air resistance of the airplane which may allow to reduce the consumption of fuel at the same time.

At the same time, a device according to an exemplary embodiment of the present invention or a method according to an exemplary embodiment of the present invention, respectively, may prevent the generation of unwanted linear distortions in the regulation loop and accounts for no further unwanted modes being excited.

Finally, it is noted that a device according to an exemplary embodiment of the present invention or a method according to an exemplary embodiment of the present invention is not to be seen as limited to applications for reduction of structural load or damping of vibration, respectively, in big airplanes. Application possibilities for reduction of structural load or damping of vibration, respectively, are given in connection to all bigger spatial structures, like, for example, also at ships, bridges and buildings.

LIST OF REFERENCE CHARACTERS 1 airplane
2 first bending mode
3 second bending mode
4 direction of flight
5 body
6 nose
7 back
8 sensor means
9 controlling, guiding and regulating surfaces
11 arrow
12 arrow
13 arrow
14 curve progression
15 curve progression
16 accentuation 17 accentuation
18 dominant mode
19 accentuation
20 dominant eigenmovement
21 device
22 airplane
23 body
24 nose
25 back
26 airfoils
27 sensor means
28 front body region
29 blasts
30 arrow
31 measurement signal
33 regulation arrangement
34 frequency measurement arrangement
35 frequency signal
36 leading back signal
37 spoiler
38 rudder
39 aileron
40 controlling, guiding and regulating surfaces
41 arrow
42 regulation arrangement
43 regulation line
44 resonance filter
45 phase correcting unit
46 phase correcting unit
47 amplification factor unit
48 amplification factor unit
49 inverter
50 measurement signal
51 signal
52 leading back signals
53 leading back signal
54 leading back signal
55 leading back signal
56 curve progression
57 curve progression
58 accentuation
59 curve progression
60 curve progression
61 curve progression
62 curve progression
63 curve progression
64 curve progression
65 dominant mode
66 regulation arrangement
67 regulation line
68 regulation line
69 resonance filter
70 phase correcting unit
71 phase correcting unit
72 amplification factor unit
73 amplification factor unit
74 resonance filter
75 phase correcting unit
76 phase correcting unit
77 amplification factor unit
78 amplification factor unit
79 measurement signal
80 adding unit
81 adding unit
82 leading back signal
83 leading back signal
84 leading back signal
85 leading back signal
86 leading back signal
87 leading back signal
88 inverter
89 leading back signal
90 curve progression
91 curve progression
92 accentuation
93 curve progression

What is claimed is:

1. A damping system for damping at least one of at least one rigid body mode of an aircraft and at least one elastic mode of the aircraft for at least one of blast load reduction, increase of stability and increase of comfort in an aircraft, the aircraft having thereon at least one of a controlling surface, a guiding surface and a regulating surface, at least two of the controlling surface, the guiding surface and the regulating surface being formed by at least one of an aileron, a rudder and a spoiler of the aircraft,
the damping system comprising:
a sensor positioned in the aircraft to detect a lateral force experienced by the aircraft and to generate a sensor signal relating to the lateral force;
a controller connected to the sensor to receive the sensor signal and operable responsive to the sensor signal to modify the at least one of the at least one rigid body mode and the at least one elastic mode of the aircraft; and
an actuator connected to the controller and operable to receive controller signaling from the controller and responsive to the controller signaling to control and to modify the at least one of the controlling surface, the guiding surface and the regulating surface of the aircraft,
wherein the controller comprises a respective resonance filter for each of the at least one rigid body mode and the at least one elastic mode to be modified, and each resonance filter comprises at least two phase correcting units operable to generate the controller signaling comprising at least two feedback signals for moving the at least two of the controlling surface, the guiding surface and the regulating surface for damping at least one of the at least one rigid body mode and the at least one elastic mode of the aircraft.

2. The damping device of claim 1,
wherein the sensor signaling comprises the sensor outputting a measurement signal relating to lateral acceleration detected by the sensor to the controller, and the measurement signal is operable for modifying the at least one of the at least one rigid body mode and the at least one elastic mode of the aircraft.

3. The damping device of claim 1,
wherein each resonance filter is parameterized by an eigenfrequency $\omega_0$ and by a damping for modifying the operation of the respective resonance filter to the at least one of the at least one rigid body mode and the at least one elastic mode to be modified.

4. The device of claim 1, further comprising:
at least one amplifier for each of the at least two phase correcting units of each of the resonance filters, the at least one amplifier being connected after each of the phase correction units for generating at least one feedback signal which is supplied back to the at least one of the controlling surface, the guiding surface and the regulating surface of the aircraft via the actuator.

5. The damping device of claim 1, wherein the device has a maximal effective combination of the at least one of the controlling surface, the guiding surface and the regulating surface for minimizing wear of the actuator and a consumption of energy.

6. The damping device of claim 5, further comprising:
at least one adder provided in the controller and operable to combine the at least two feedback signals to generate a combined feedback signal operable for driving the actuator, the controller being operable to modify at least two of the at least one rigid body mode and the at least one elastic mode of the aircraft,
wherein the at least two feedback signals are generated from different ones of the resonance filters.

7. The damping device of claim 6, wherein in case of a phase shift of about 180° between the two feedback signals, the respective phase correcting unit is replaceable with an inverter.

8. The damping device of claim 1, further comprising:
a frequency measurement circuit for outputting a frequency signal representing
the at least one of the at least one rigid body mode and the at least one elastic mode of the aircraft,
wherein the controller has an input for receiving the frequency signal.

9. A method of damping at least one of at least one rigid body mode and at least one elastic mode of an aircraft for at least one of blast load reduction, increase of stability and increase of comfort in an aircraft, the aircraft having thereon at least one of a controlling surface, a guiding surface and a regulating surface, at least two of the controlling surface, the guiding surface and the regulating surface being both formed by at least one of an aileron, a rudder and a spoiler of the aircraft,
the damping method comprising:
detecting by a sensor positioned in the aircraft a lateral force experienced by the aircraft;
transmitting sensor signaling corresponding to the lateral forces detected from the sensor to a controller connected to the sensor;
operating a resonance filter and at least two phase correction units comprised in the controller to generate, based on the sensor signaling, at least two feedback signals, and transmitting from the controller the at least two feedback signals to an actuator;
according to the at least two feedback signals from the controller, modifying by the actuator the at least one of the at least one rigid body mode and the at least one elastic mode of the aircraft by moving the at least two of the controlling surface, the guiding surface and the regulating surface of the aircraft, for damping at least one of the at least one rigid body mode and the at least one elastic mode of an aircraft.

10. The method of claim 9, further comprising the steps of:
outputting a measurement signal from the sensor to the controller, the measurement signal operative for modifying the at least one of the at least one rigid body mode and the at least one elastic mode of the aircraft.

11. The method of claim 9, wherein the modifying of the at least one of the at least one rigid body mode and the at least one elastic mode of the aircraft further comprises the steps of:
performing a resonance filtering of a signal relating to the at least one of the at least one rigid body mode and the at least one elastic mode of the aircraft; and
performing a phase correction of the resonance filtered signal of the at least one of the at least one rigid body mode and the at least one elastic mode of the aircraft for forming the at least one feedback signal.

12. The method of claim 9, further comprising the steps of:
performing a parameterisation of the resonance filter by an eigenfrequency $\omega_0$ and by a damping for modifying the operation of the resonance filter to the at least one of the at least one rigid body mode and the at least one elastic mode of the aircraft to be modified.

13. The method of claim 9, further comprising the steps of:
performing an amplification for forming the at least one feedback signal;
supplying the feedback signal back to the at least one of the controlling surface, the guiding surface and the regulating surface of the aircraft via the respective actuator.

14. The method of claim 12, further comprising the step of:
modifying at least two of the at least one rigid body mode and the at least one elastic mode of the aircraft; and
combining the at least two feedback signals to a combined feedback signal for driving the actuator,
wherein the at least two feedback signals stem from different ones of the resonance filters.

15. The method of claim 11, further comprising the step of:
inverting the resonance filtered signal of the at least one of the at least one rigid body mode and the at least one elastic mode of the aircraft for forming the at least one feedback signal in case of a phase shift of about 180° between two feedback signals.

16. The method of claim 9, further comprising the step of:
supplying a frequency signal of a frequency measurement arrangement representing a frequency of the at least one of the at least one rigid body mode and the at least one elastic mode of the aircraft.

* * * * *